United States Patent

[11] 3,624,423

[72] Inventor Fred Borgini
Willingboro, N.J.

[21] Appl. No. 42,941
[22] Filed June 3, 1970
[45] Patented Nov. 30, 1971
[73] Assignee RCA Corporation

[54] CLOCKED SET-RESET FLIP-FLOP
10 Claims, 1 Drawing Fig.

[52] U.S. Cl. .......... 307/279, 307/205, 307/208, 307/246
[51] Int. Cl. .......... H03k 3/26
[50] Field of Search .......... 307/205, 208, 246, 251, 269, 279, 304

[56] References Cited
UNITED STATES PATENTS
3,458,825 7/1969 Lagemann .......... 307/208 X

*Primary Examiner*—Stanley T. Krawczewicz
*Attorney*—H. Christoffersen

ABSTRACT: Successive clock pulses applied to the clock pulse terminals of a flip-flop cause it successively to change state. A set pulse or reset pulse may be applied to the flip-flop concurrently with a clock pulse which tends to place the flip-flop in a state different than the state intended by the set or reset pulse. The present circuit includes means responsive to the set or reset pulse for preventing the clock pulse from having any effect on the flip-flop. The means may comprise a logic gate to which the clock pulses are applied, storage means for priming the gate when charged, and means responsive to a set or reset pulse for discharging the storage means.

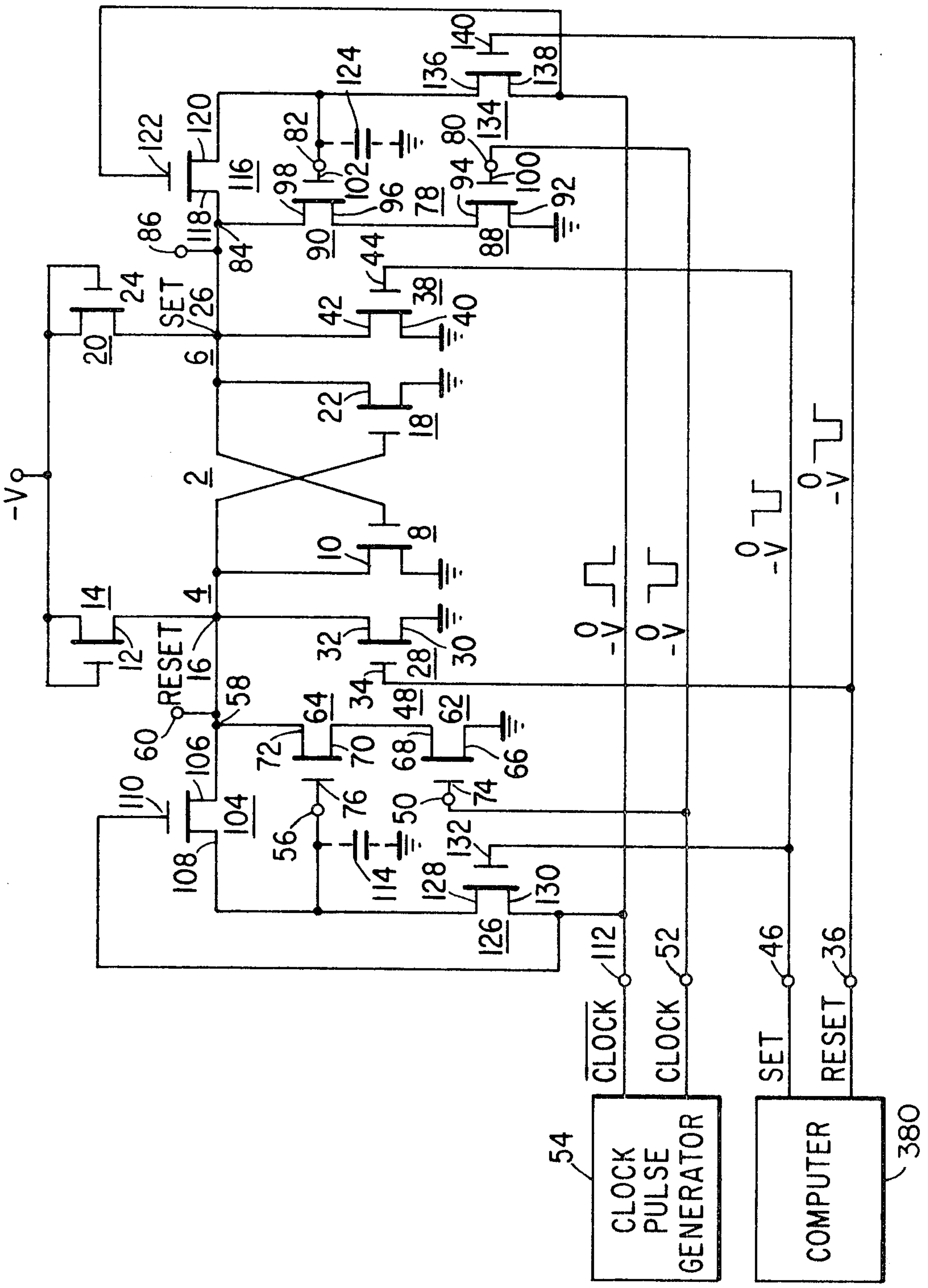
INVENTOR
Fred Borgini
BY W. Christoffersen
ATTORNEY

CLOCKED SET-RESET FLIP-FLOP

BACKGROUND OF THE INVENTION

A clocked set-reset flip-flop is one which is caused successively to change state in response to successive clock pulses. If the set and reset pulses are synchronous with the clock pulses, that is the set and reset pulses occur between clock pulse times, no problems are encountered. On the other hand, when the set and reset pulses are asynchronous, a clock pulse may tend to change the state of the flip-flop to a state different than that intended by the set or reset pulse.

It is the object of this invention to provide a set-reset flip-flop which is nonresponsive to a clock pulse which is applied concurrently with a set or reset pulse and which tends to change the flip-flop to a state different than that intended by the set or reset pulse.

SUMMARY OF THE INVENTION

A set-reset flip-flop periodically changes state in response to periodic clock pulses. Means are included for preventing the response of the flip-flop to a clock pulse which is applied concurrently with a set or reset pulse, and which clock pulse tends to change the flip-flop to a state different than that intended by the set or reset pulse.

BRIEF DESCRIPTION OF THE DRAWINGS

The sole FIG. is a schematic diagram embodying the invention.

DETAILED DESCRIPTION

The flip-flop disclosed may be fabricated in integrated form or discrete form utilizing field-effect transistors.

For ease of illustration, insulated gate field-effect transistors (IGFETS) of the enhancement type are used to illustrate a flip-flop circuit. However, any of the known types of field-effect transistors, e.g. depletion type IGFETS or junction field-effect devices may be used in the practice of the invention.

The IGFETS of the enhancement type have a first electrode and a second electrode defining a conduction path and a control electrode (gate) whose applied potential determines the conductivity of the conduction path. The first and second electrodes of an IGFET are referred to as the source and drain electrodes. For a P-type IGFET, the source electrode is defined as that electrode of the first and second electrodes having the highest potential applied thereto. For an N-type device, the source electrode is defined as that electrode of the first and second electrodes having the lowest potential applied thereto.

For conduction to occur, the applied gate-to-source potential ($V_{GS}$) must be in a direction to forward bias the gate with respect to the source and must be greater in magnitude than a given value which is defined as the threshold voltage ($V_T$). Thus, where applied $V_{GS}$ is in a direction to forward bias the transistor but is lower in amplitude than $V_T$, the transistor remains cut off and there is substantially no current in the conduction path. In other words if the power supply voltage does not exceed the threshold voltage ($V_T$) of the transistor it is impossible to turn the transistor on.

The flip-flop is to be described as operating with P-type transistors. However, N-type transistors may be used if proper polarity of the power supply voltage is observed.

The convention adopted is that a relatively negative voltage (−V) is indicative of a binary 1 and a relatively positive voltage (0) is indicative of a binary 0.

In the sole figure, a flip-flop 2 is comprised of two cross-coupled inverters 4 and 6. The first inverter is an inverting P-type device 8 having its drain electrode 10 connected to the source electrode 12 of a P-type load device 14. The connection of the drain electrode 10 and the source electrode 12 form a reset terminal 16 for the flip-flop.

The second inverter 6 comprises a P-type inverting device 18 and a P-type load device 20. The connection of the drain electrode 22 and the source electrode 24 of devices 18 and 20, respectively, form the set terminal 26 of the flip-flop.

A P-type switch device 28 is connected at its source electrode 30 to circuit ground and at its drain electrode 32 to the reset terminal 16 and at its gate electrode 34 to a reset line 36. The latter receives reset pulses from a computer 380 or other suitable data source. A P-type switch device 38 is connected at its source electrode 40 to circuit ground and at its drain electrode 42 to the set terminal 26 and at its gate electrode 44 to a set line 46 which receives set pulses from the computer 380 or the like.

Logic gate 48 includes two P-type field effect devices 62 and 64. Its first input terminal 50 is at the gate electrode 74 of device 62 and is connected to a line 52 to which periodic clock pulses from a clock pulse generator 54 are applied. The second input terminal 56 of the logic gate 48 is the gate electrode 76 of device 64 and the output terminal 58 of the logic gate 48 is the drain electrode 72 of device 64. This electrode 72 is connected to the reset terminal 16 and the output terminal 60 for the flip-flop. The source electrode 66 of device 62 is connected to circuit ground and the drain electrode 68 is connected to the source electrode 70 of device 64.

A second logic gate 78, includes two P-type field effect devices 88 and 90. Its first input terminal 80 is at the gate electrode 100 of device 88 and is connected to the line 52. A second input terminal 82 of the logic gate 78 is the gate electrode 102 of device 90 and the output terminal 84 of the logic 78 is the drain electrode 98 of device 90. This electrode 98 is connected to the set terminal 26 of the flip-flop and the output terminal 86 of the flip-flop. The source electrode 92 of device 88 is connected to circuit ground and the drain electrode 94 is connected to the source electrode 96 of device 90.

A first transmission device or switch is formed by P-type device 104 having a first electrode 106 connected to reset terminal 16 and a second electrode 108 connected to the second input terminal 56 of gate 48. The control or gate electrode 110 of device 104 is connected to a terminal 112 which receives $\overline{\text{clock}}$ pulses from the clock pulse generator 54. The $\overline{\text{clock}}$ pulses are complementary to the clock pulses applied to terminal 52. A charge storage means such as capacitor 114 is present at the input terminal 56 of gate 48. The capacitor 114 comprises the normal MOS capacitance of the device 64. For this reason, the capacitor is illustrated by dashed lines.

A second transmission device or switch is comprised of a P-type device 116 having a first electrode 118 connected to the set terminal 26 and a second electrode 120 connected to the input terminal 82 of gate 78. The control or gate electrode 122 of device 116 is connected to the terminal 112. A charge storage means such as capacitor 124 is present at the input terminal 82 of the gate 78. The capacitor 124 is comprised of the normal MOS capacitance of device 90. For this reason the capacitor 124 is illustrated by dashed lines.

A transmission gate or switch is comprised of a P-type device 126. A first electrode 128 is connected to input terminal 56 of gate 48 and a second electrode 130 is connected to the $\overline{\text{clock}}$ terminal 112. The control or gate electrode 132 is connected to the set input line 46. Another transmission gate or switch 134 has a first electrode 136 connected to the input terminal 82 of gate 78 and the second electrode 138 connected to the $\overline{\text{clock}}$ input terminal 112. The control or gate electrode 140 is connected to the reset input line 36.

The flip-flop 2 periodically changes state in response to the clock pulses applied to the input terminal 52. The flip-flop may also be set and reset asynchronously in response to set and reset pulses applied to the terminal or lines 46 and 36 respectively.

Consider first the operation of the circuit when the set and reset input lines 46 and 36 are both at a binary 0 level (ground). Devices 28, 38, 126, and 134 are nonconductive because their gate and source electrodes are all at ground. Assume that the flip-flop 2 is in the set state, that is, reset terminal 16 is at a level indicative of a binary 1 (−V). P-type device 18 is conductive and P-type device 8 is nonconductive.

Assume that $\overline{\text{clock}}$ is at a level indicative of a binary 1 (−V). Devices 104 and 116 are therefore conductive. Capacitor 114 charges to the binary 1 level (−V) at reset terminal 16 by way of the conduction path of the device 104. Capacitor 124 discharges to 0 volts as set terminal 26 is at a binary 0 (ground) level.

Now assume $\overline{\text{clock}}$ goes to a binary 0 level (ground) and a clock pulse applied to terminal 52 goes to a level indicative of a binary 1 (−V). Devices 104 and 116 become nonconductive and input terminals 50 and 56 of gate 48 are both at a 1 level (−V) since terminal 52 is at a 1 level and capacitor 114 is charged to a level indicative of a 1. This causes devices 62 and 64 to become conductive. Reset terminal 16, therefore, is essentially driven to ground potential (binary 0) by way of the conduction paths of devices 62 and 64. The 0 volts present at reset terminal 16 is applied to the gate electrode of P-type device 18 cutting this device off. Set terminal 26 therefore goes to −V the binary 1 level, by way of the conduction path of device 20 and the −V level is applied to the gate electrode of the device 8 making it conductive and thereby, holding reset terminal 16 at 0 volts. Thus, the flip-flop has changed from the set to the reset state.

$\overline{\text{Clock}}$ then goes to a binary 1 level and clock goes to a binary 0 level. Devices 104 and 116 again become conductive and devices 62 and 88 become nonconductive. Capacitor 114 discharges through device 104 and device 8 to ground, the potential at reset terminal 16. Capacitor 124 charges to −V, the binary 1 level, of set terminal 26 by way of device 116. $\overline{\text{Clock}}$ now returns to a binary 0 level and clock pulse returns to a binary 1 level. Devices 104 and 116 become and and devices 88 and 90 become conductive since clock is at a 1 level (−V) and capacitor 124 is at a 1 level (−V). Thus the set terminal 26 returns to a binary 0 level (ground). Device 8 becomes nonconductive and device 18 becomes conductive. The flip-flop is once again in the set state. The flip-lop continues to change state in the manner described with each application of a clock pulse to the terminal 52.

Consider now the operation of the flip-flop when set and reset pulses are applied asynchronously. In this instance, a clock may tend to change the flip-flop to a state different than that intended by the set or reset pulse. Assume that $\overline{\text{clock}}$ is at a binary 1 level and clock is at a binary 0 level. In this instance, devices 62 and 88 are nonconductive and the paths to ground from the set and reset terminals 26 and 16 via the logic gates 78 and 48, respectively are at a high value of impedance. If the flip-flop is in the set state, that is, reset terminal 16 is at a level of −V and set terminal 26 is at ground, the application of a reset pulse at a level of −V to the gate electrode 34 of device 28 makes it conductive. This places the reset terminal 16 at 0 volts. Device 38 is already cut off and placing terminal 16 at 0 volts cuts off device 18. Thus set terminal 26 goes to −V volts via load device 20. Accordingly, the flip-flop has changed from the set to the reset state, that is, reset terminal 16 has changed from −V to 0 volts and set terminal 26 has changed form 0 to −V volts.

The application of a set pulse at a level of −V to the gate electrode 44 of device 38 makes it conductive such that set terminal 26 returns to a level of 0 volts (set state) and the flip-flop again changes state.

Assume now that the flip-flop is in the reset state, that is reset terminal 16 is at binary 0 and set terminal 26 is at a binary 1 and $\overline{\text{clock}}$ is at a binary 1 (−V). Capacitor 114 is charged to a level of zero volts and capacitor 124 is charged to −V which is indicative of a binary 1. Assume that $\overline{\text{clock}}$ is at a binary 0 level and reset is at a binary 0 level. A clock pulse and a set pulse are concurrently applied to the flip-flop. This is an instance in which the clock pulse tends to change the flip-flop to the same state as intended by the set pulse. The logic gate 48 is inoperative as the input terminal 56 is at a binary 0 level. The transmission device 126 is conductive as its gate electrode is at a binary 1 level (−V) and its electrode 130 is at a binary 0 level (ground). This charges the capacitor 114 to ground. The logic gate 78 is operative as its input terminals 80 and 82 are both at a binary 1 level (−V). Set terminal 26 therefore goes to a binary 0 level (ground) by way of the gate 78. Set terminal 26 is also driven to a binary 0 level by device 38, which is also conductive due the set pulse applied to its gate electrode. The flip-flop, therefore remains in the set state.

Now consider a case in which the clock pulse tends to change the state of the flip-flop to a state different than that intended by the set pulse. A set and clock pulse are again concurrently applied to the flip-flop. However, in this instance assume that the flip-flop is in the set state, that is, its reset terminal at a binary 1 level (−V) and its set terminal is at a binary 0 level (ground). The capacitor 114 is charged to −V volts—the binary 1 level, and the capacitor 124 is uncharged—the binary 0 level.

In the absence of the circuit of the present invention, the set pulse applied to the gate electrode 44 of transistor 38 would place the transistor in its conducting state and set terminal 26 would be held at ground potential. The clock pulse would be applied to the gate electrode 50 of transistor 62 placing its conduction path in a low impedance condition and the charge on capacitor 114 would maintain the conduction path of transistor 64 in a low impedance condition. Therefore, there would be a low impedance path between reset terminal 16 and ground so that the reset terminal would tend to go to ground potential. In other words, the clock and set pulses would have opposite effects on the flip-flop and would result in both the set and reset terminals being at the same potential namely ground—a condition which is not permitted.

The undesired operation discussed above does not occur in the circuit of the present application. The set pulse is applied to the gate electrode 132 of transistor 126 placing this transistor in its low impedance condition. This discharges the capacitor 114 placing the gate electrode 56 at ground potential. Accordingly, while the clock pulse applied to the gate electrode 50 of transistor 62 places its conduction path in a low impedance condition, the conduction path of transistor 64 remains in a high impedance condition so that the series conduction paths of transistor 62 and 64 of logic gate 48 do not provide a low impedance path between reset terminal 16 and ground. The reset line 36 is at ground potential so that transistor 28 is cut off and its conduction path between reset terminal 16 and ground is at a high value of impedance. Finally, the ground potential present at set terminal 26 maintains transistor 8 cut off so that it offers a high impedance between reset terminal 16 and ground. It is clear, therefore, that the −V volts present at reset terminal 16 that is, the binary 1 level present there, remains present in response to the concurrent application of a clock pulse and a set pulse. Similarly, the concurrent application of a clock and set pulse does not disturb the 0 volts present at the set terminal 26.

Device 134 performs the function of permitting capacitor 124 to discharge whenever a clock pulse and a reset pulse are concurrently applied to the flip-flop and the flip-flop's reset terminal is at a binary 0 level (ground) and set terminal at a binary 1 level (−V). This prevents the clock pulse from changing the flip-flop to a set state when a reset pulse is concurrently applied. The operation is similar to that described for device 126 when a set and clock pulse are concurrently applied and the flip-flop is in the set state.

In summary, the flip-flop is not permitted to respond to a clock pulse which is applied concurrently with a set or reset pulse and which tends to change the flip-flop to a state different than that intended by the set or reset pulse.

I claim:

1. In combination:

a flip-flop;

first means connected to said flip-flop for periodically changing the state of said flip-flop in response to periodic clock pulses;

second means connected to said flip-flop for setting and resetting said flip-flop in response to set and reset pulses, respectively; and third means connected to said flip-flop and to said first means and said second means for preventing the changing of state of said flip-flop in response to a clock pulse which is applied concurrently with one of said set and reset pulses, and which clock pulse tends to change the flip-flop to a state different than that intended by said one of said set and reset pulses.

2. In combination:

a flip-flop having set and reset terminals to which pulses may be applied for changing the state of said flip-flop;
first and second charge storage means;
means for generating set and reset pulses;
means for generating two sets of clock pulses, one complementary to the other
first and second transmission gates each having input and output terminals and a control terminal, the input terminal of the first being connected to said reset terminal and the output terminal of the first being connected to said first charge storage, the input terminal of the second being connected to said set terminal and the output terminal of the second being connected to said second charge storage means, and the control terminal of each gate being connected to the means for generating said first set of clock pulses;
third and fourth transmission gates each having input and output terminals and a control terminal, the input terminal of the third being connected to the output terminal of said first transmission gate and said first charge storage means, the control terminal of the third being connected to said means for generating set pulses, the input terminal of the fourth being connected to the output terminal of said second gate and said second charge storage means, the output terminal of said third and fourth gate being connected to the means for generating said first set of clock pulses;
a current source;
first and second field effect transistors each having input, output, and control electrodes, the output electrode of the first being connected to the input electrode of the second, the input electrode of the first being connected to said current source, the control electrode of the first being connected to said means for generating said second set of clock pulses, and the output electrode of the second being connected to said reset terminal and the control electrode of the second being connected to said first charge storage means; and
third and fourth field effect transistors each having input, output, and control electrodes, the output electrode of the third being connected to the input electrode of the fourth, the input electrode of the third being connected to said current source, the control electrode of the third being connected to said means for generating said second set of clock pulses, and the output electrode of the fourth being connected to said set terminal and the control electrode of the fourth being connected to said second charge storage means.

3. In the combination as set forth in claim 2, said last-named means comprising:

a two input terminal logic gate,
a charge storage element coupled to one input terminal of said gate for priming said gate, when charged said other input terminal comprising a clock pulse terminal to which said clock pulses are applied for enabling said gate when said capacitor is charged; and
means responsive to said one of said set and reset pulses for discharging said charge storage element.

4. In combination:

a flip-flop having set and reset terminals to which pulses may be applied for changing the state of said flip-flop;
first and second charge storage means:
means for generating first and second sets of clock pulses which are complementary to each other;
means connected to receive and be responsive to said first set of clock pulses to selectively provide a circuit path for charging said first and second charge storage means to the voltages at said set and reset terminals, respectively;
means connected to receive and be responsive to the concurrent application of a set pulse and a pulse in said first set of clock pulses to selectively provide a circuit path for discharging said first charge storage means;
means connected to receive and be responsive to the concurrent application of a reset pulse and a pulse in said first set of clock pulses to selectively provide a circuit path for discharging said second charge storage means; and
means for applying a pulse to one of said set and reset terminals for changing the state of said flip-flop in response to one of said charge storage means being charged concurrent with the production of a pulse in said second set of clock pulses.

5. The combination claimed in claim 4 said means responsive to said first set of clock pulses for charging said first and second charge storage means comprising first and second switches each having an input terminal, an output terminal and a control terminal, the input terminal of the first being connected to the reset terminal and the output terminal to said first charge storage means, and the input terminal of the second being connected to the set terminal and the output terminal being connected to said second charge storage means, the control terminal of each switch being responsive to said first set of clock pulses.

6. The combination claimed in claim 5 said means responsive to the application to said set terminal of a set pulse concurrently with the production of a pulse in said first set of clock pulses for discharging said first charge storage means comprising a field effect transistor having an input electrode, an output electrode and a control electrode, the input electrode being connected to said first charge storage means and the output electrode being connected to the means for generating said first set of clock pulses, and the control terminal being responsive to said set pulse.

7. The combination claimed in claim 6 said means responsive to the application to said reset terminal of a reset pulse concurrently with the production of a pulse in said first set of clock pulses for discharging said second charge storage means comprising a field effect transistor having an input electrode, and output electrode, and a control electrode, the input electrode being connected to said second charge storage means, and the output electrode being connected to the means for generating said first set of clock pulses, and the control terminal being responsive to said reset pulse.

8. The combination claimed in claim 7 the means for applying a pulse to one of said terminals for changing the state of said flip-flop comprising first and second gates each having two input terminals and an output terminal, one input terminal of each gate being connected to the means for generating said second set of clock pulses, the other input terminal of the first gate being connected to said first charge storage means and the output terminal of first gate being connected to said reset terminal, the other input terminal of the second gate being connected to said second charge storage means and the output terminal of the second gate being connected to said set terminal.

9. In a system wherein a binary "1" is represented by a signal or level of V1 volts and a binary "0" is represented by a signal or level of V0 volts, where $V0 \neq V1$, the combination comprising:

a flip-flop having set and reset terminals to which pulses may be applied for changing the state of said flip-flop;
first and second charge storage means;
means for generating set and reset pulses;
means for generating two sets of clock pulses, one complementary to the other, that is, when the first set is at a level V1 and the second set is at a level V0 and vice versa;
first and second gates each having first and second input terminals and an output terminal at which a signal level V0 is produced when both the input terminals are at a level V1, the first input terminal of each gate being connected to said means for generating said second set of clock pulses, the second input terminal of the first gate being connected to said first charge storage and the output terminal of the first gate being connected to said reset terminal, and the second input terminal of said second gate being connected to said second charge storage means and the output terminal of said second gate being connected to said set terminal;

means for charging said first and second charge storage means to the levels at said reset and set terminals, respectively, each time a clock pulse in said first set is at a level V1;

means for discharging said first charge storage means in response to said set pulse being at a level V1 concurrent with a pulse from said first set of clock pulses being at a level V0; and means for discharging said second charge means in response to said reset pulse being at a level V1 concurrent with a pulse from said first set of clock pulses being at a level V0.

10. In combination:

a flip-flop having clock pulse input terminals to which clock pulses may be applied for changing the state of the flip-flop and set and reset pulse input terminals to which set and reset pulses may be applied for setting and resetting said flip-flop;

means for applying successive clock pulses to clock pulse input terminals for successively changing the state of said flip-flop;

means for applying set and reset pulses to said set and reset terminals for setting and resetting said flip-flop respectively; and means responsive to the concurrent application of a clock pulse which tends to place the flip-flop in one state and to a set or reset pulse which tends to place the flip-flop in its other state for inhibiting the effect of said clock pulse and thereby placing the flip-flop in the state called for by said set or reset pulse.

* * * * *